(12) United States Patent
Wu

(10) Patent No.: US 6,934,375 B2
(45) Date of Patent: Aug. 23, 2005

(54) SYSTEM FOR POSITIONING STAFF IN OFFICE

(75) Inventor: Chung-Wei Wu, Taipei Hesin (TW)

(73) Assignee: Lite-On Technology Corp., Taipei (TW)

( * ) Notice: Subject to any disclaimer, the term of this patent is extended or adjusted under 35 U.S.C. 154(b) by 55 days.

(21) Appl. No.: 10/452,601

(22) Filed: Jun. 2, 2003

(65) Prior Publication Data

US 2004/0146152 A1 Jul. 29, 2004

(30) Foreign Application Priority Data

Jan. 28, 2003 (TW) .......................... 92101860 A

(51) Int. Cl.[7] .............................................. H04M 3/42
(52) U.S. Cl. .................................................. 379/201.01
(58) Field of Search ................................... 379/201.01

(56) References Cited

U.S. PATENT DOCUMENTS 5,515,426 A  *  5/1996  Yacenda et al. ........ 379/201.07
5,979,762 A  *  11/1999 Bianco ................... 235/462.01
2004/0033795 A1 *  2/2004  Walsh et al. ............. 455/404.1

* cited by examiner

Primary Examiner—Creighton Smith
(74) Attorney, Agent, or Firm—Elliott N. Kramsky

(57) ABSTRACT

The present invention to a system for positioning staff in an office, which comprises a plurality of fixed identification reader devices, a plurality of identification devices and a host computer. Each staff carries the identification device. The identification reader devices are places at fixed points of the terminal of the system to record and identify staff near the terminal. The host computer is used for collecting and recording the information read by the reader devices. Thereby, the system for position staff in an office according to the present invention could manage the staff in an office efficiently.

2 Claims, 2 Drawing Sheets

| item | person | location |
|---|---|---|
| 1 | John | A |
| 2 | Mark | E |
| 3 | Tim | C |
| 4 | Jessica | E |
| 5 | Lucy | B |

Table 1

| item | person | Closest terminal |
|---|---|---|
| 1 | John | b' |
| 2 | Mark | e' |
| 3 | Tim | d' |
| 4 | Jessica | e' |
| 5 | Lucy | c' |

Table 2

SYSTEM FOR POSITIONING STAFF IN OFFICE

BACKGROUND OF THE INVENTION

1. Field of the Invention

The present invention relates to a system for positioning staff in an office, and more particularly to a system utilized to position a person in office through an identification reading device and identification device.

2. Description of Related Art

At present, the tracking of staff in offices almost depends on manual effort. Finding a person in a big company office with many rooms sometimes becomes a very difficult job. Especially when the colleague of the person's has urgent stuff to discuss with him or a telephone exchange operator needs to switch an important incoming phone call to him, if he is not at his place or if he is unable to be located, an important business could be delayed or an important phone call could be missed. Efficiency is most important in today's world, the shortcomings mentioned above must be resolved.

SUMMARY OF THE INVENTION

The present invention is used to solve the above-mentioned problems with a system for positioning staff in an office by modern progressive technology. Each staff is asked to carry an identification device such as non-contact IC card or Bluetooth wireless device with him in the system for positioning staff in an office according to the present invention. Besides, a plurality of non-contact IC card readers or Bluetooth wireless devices are disposed at the terminals of the system in order to identify the staff and record the identification.

The main object of the present invention is to provide a system for positioning staff in an office, a certain person that is not at his place can be found through the system so as to prevent a business from delaying when a boss or a colleague find him in a hurry.

Another object of the present invention is to provide a system for positioning staff in an office; the system can judge the present location of a person allocated with an extension number and switches a phone call for the person to a proper telephone with another extension.

Still another object of the present invention is to provide a system for positioning staff in an office, enabling the management in an office can be more efficient and reliable through the installment of identification reader devices and identification devices.

BRIEF DESCRIPTION OF THE DRAWINGS

The present invention can be more fully understood by reference to the following description and accompanying drawings, in which.

Figure 1:
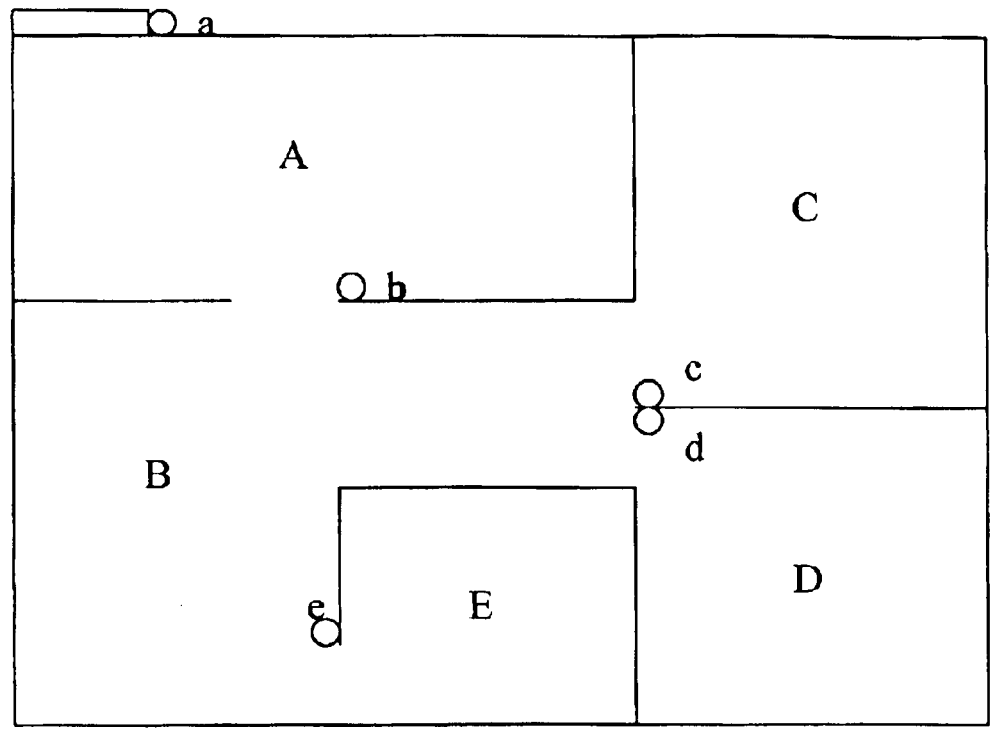
FIG. 1 is a schematic view of a preferred embodiment according to the present invention, showing a close distance identification devices disposition for a system for positioning staff in an office.
Figure 2:
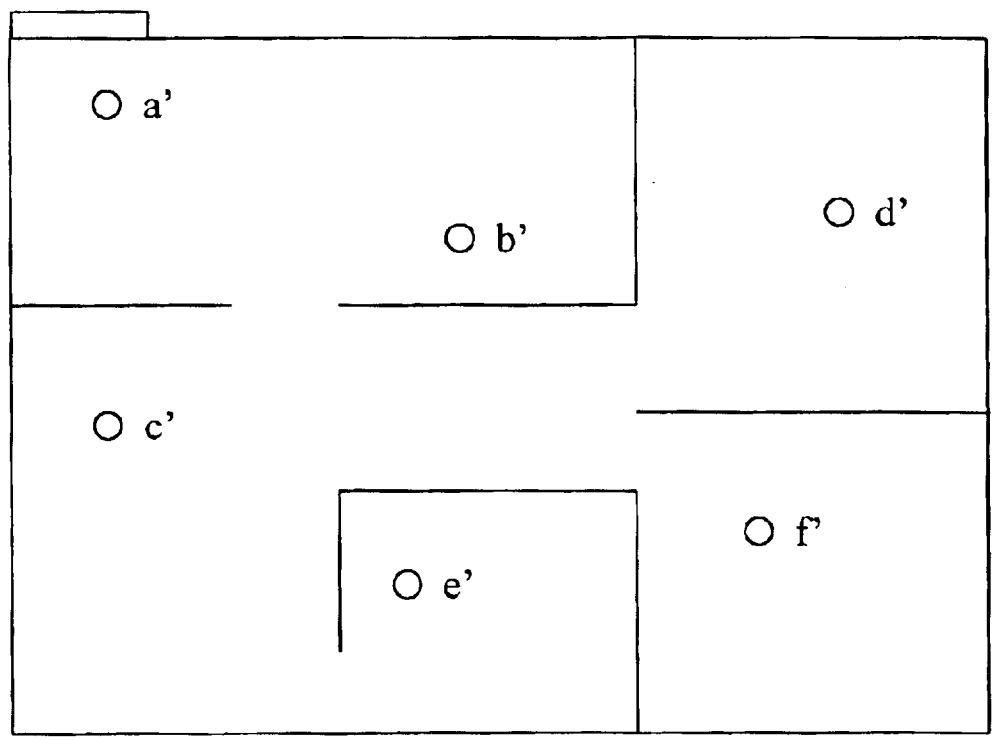
FIG. 2 is a schematic view of another preferred embodiment according to the present invention, showing a far distance identification devices disposition for a system for positioning staff in an office.

Table 1 is a system host record recording areas at where all persons in an office are now according to facilities shown in FIG. 1; and Table 2 is a system host record recording areas at where all persons in an office are now according to facilities shown in FIG. 2.

DETAILED DESCRIPTION OF THE PREFERRED EMBODIMENTS

First, please refer to FIG. 1. FIG. 1 is a schematic view of a preferred embodiment according to the present invention, showing a close distance identification devices disposition for a system for positioning staff in an office. Here, an office is divided into such as 5 partition areas, which are A, B, C, D and E respectively. Close distance identification readers a, b, c, d and e such as non-contact IC card readers are located respectively at each inlet of the partition areas A, B, C, D and E. Under such circumstance, every person in the office must carry an identification card such as non-contact IC card in order to enter each inlet. The card reader identifies the person that carries with the identification card when he enters an inlet, and then, transfers the data of the person to a system host. For example, if a person carrying with the identification card enter one after another two inlets at which two identification readers a and b are installed, the system host will have the record that the person passed through these two inlets a and b. If no change happens, the final record in the system host will stay at: the person is at the area B now. If the person further passes through the inlet installed with the identification reader device C, the system host then records that the person is at the area C.

The system main frame records the places that all the persons in the office is at now through the facilities shown in FIG. 1. For example, the record is shown as Table 1. If an authorized manager wants to inquire the present location of Tim's, he can do it through the system host to know that Tim is at the area C. If an incoming phone call is for Tim, the phone call can be transferred to any extension in the area c after the telephone exchange operator know where is Tim now from the system host even if Tim's desk is not at the area A. And, the same process is for each of the other persons in the office.

Please refer to FIG. 2. FIG. 2 is a schematic view of a preferred embodiment according to the present invention, showing a far distance identification devices disposition for a system for positioning staff in an office. The difference between the embodiment mentioned above and this embodiment is that the identification reader devices a', b', c', d' and e' used here are Bluetooth devices for instance. The reader device needs not to be disposed at the inlet of each partition area because it is far distance transmissible. And the proper disposition of the reader device is completely dependent on transmission distance and office space; more than two reader devices can even be disposed in a partition area. When a person carrying with a Bluetooth device is close to a reader device; the reader device can identify the person and transmit the person's data to the system host. The system host records the reader device that is closest to every person in the office. The exemplary record is shown in Table 2, the application range of Table 2 is the same as Table 1, and the description manner is also same, the description for Table 2 is omitted here. The embodiment mentioned here can provide a more accurate positioning data.

Furthermore, each reader device shown in FIG. 2 can be installed in a personal computer end. Bluetooth devices are more popular recently; only software is installed in a personal computer facilitated with a Bluetooth device, the personal computer can be functioned as an identification reader device concurrently. And, the person's data can be transmitted through an Internet line to the system host so that a transmission line between the host and each identification reader device is unnecessary. Such kind of structure will save system cost a lot if a Bluetooth device becomes more popular.

It is noted that the system for positioning staff in a office described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A system for positioning staff in an office, mainly comprising a plurality of identification reader devices, a plurality of identification devices and a computer host; each said identification device being carried by every person in said office, said identification reader device being fixedly installed at a terminal of said system to identify and record persons near thereto, and said host being used to collect and record data obtained by said identification reader devices, provide a staff inquiry service and provide an immediate data to form a web page for authorized persons to inquire.

2. The system according to claim 1, wherein said data can be transmitted through an Internet line to said computer host.

* * * * *